E. P. DILL.
AUTOMOBILE TIRE REMOVER.
APPLICATION FILED JULY 22, 1918.
1,317,078.
Patented Sept. 23, 1919.
2 SHEETS—SHEET 2.
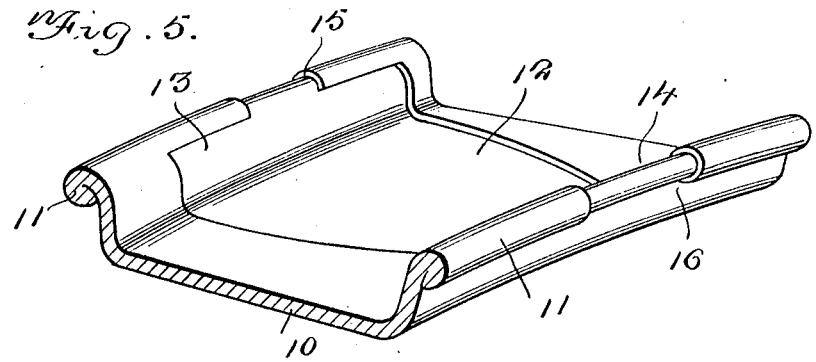
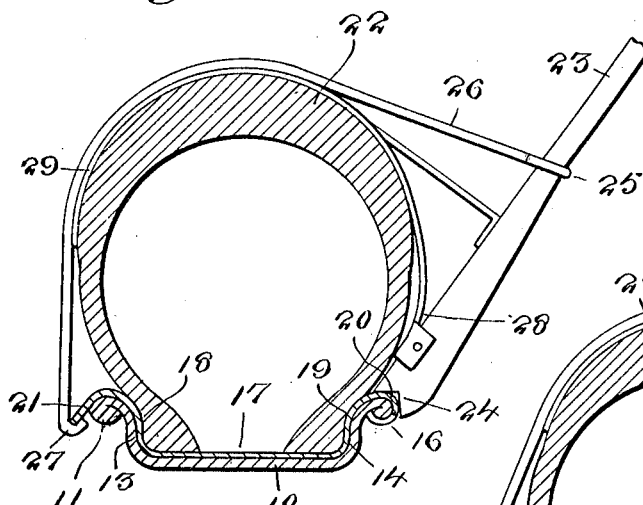
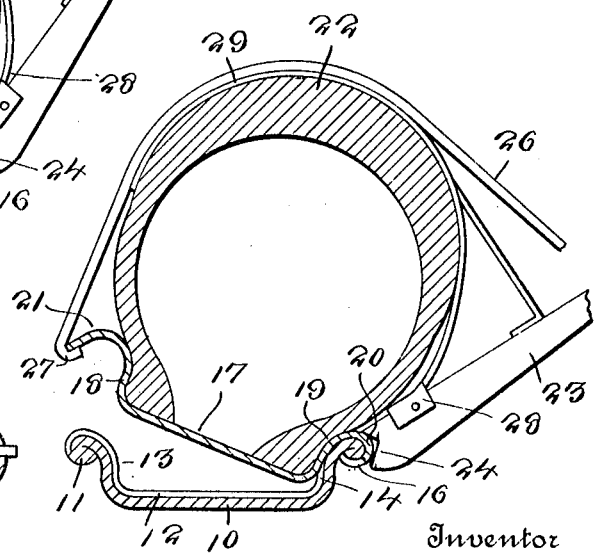
Witnesses
Inventor
E. P. Dill
By Victor J. Evans
Attorney

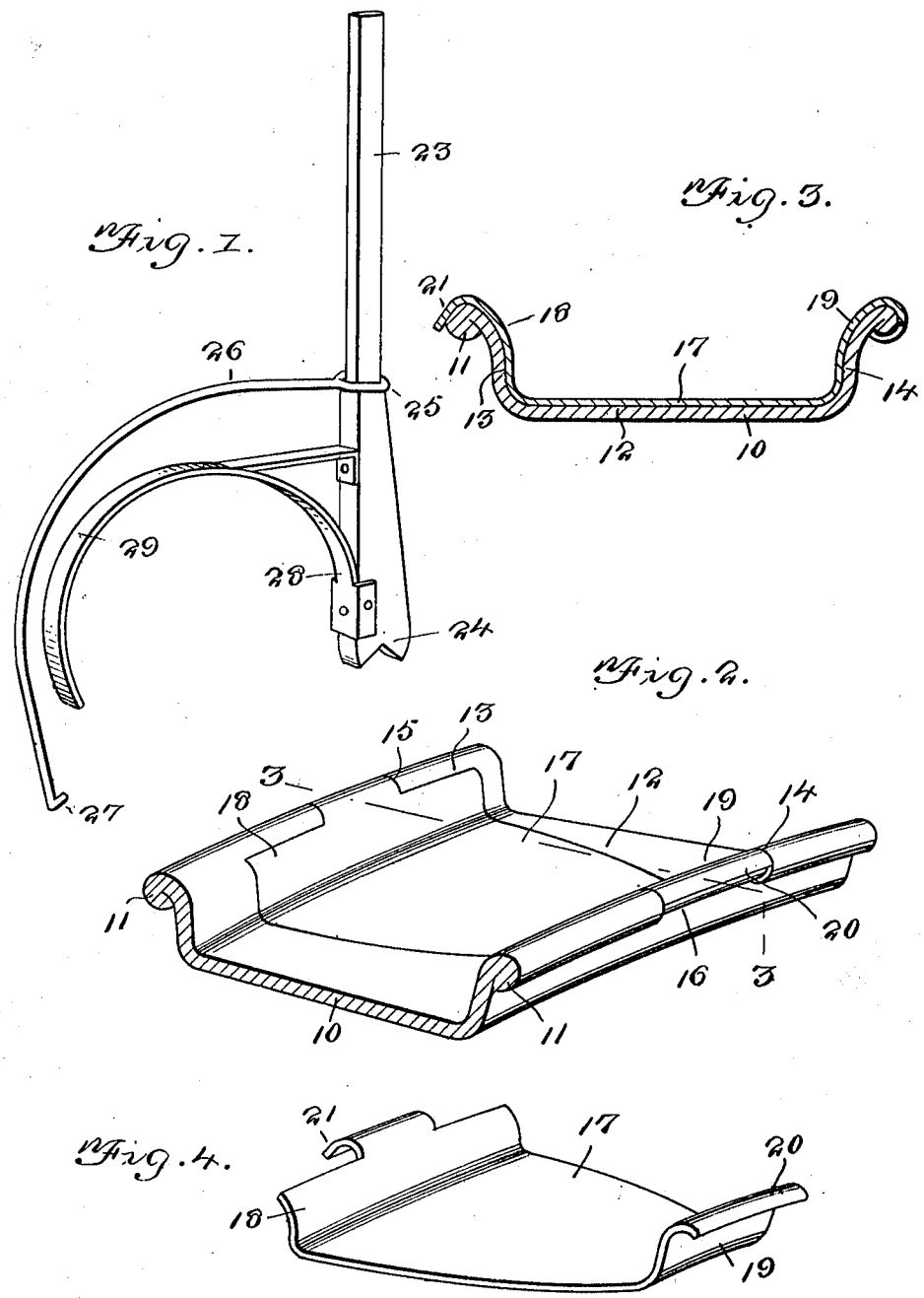

UNITED STATES PATENT OFFICE.

ENOCH P. DILL, OF PITTSBURG, KANSAS.

AUTOMOBILE-TIRE REMOVER.

1,317,078.  Specification of Letters Patent.  Patented Sept. 23, 1919.

Application filed July 22, 1918. Serial No. 246,090.

*To all whom it may concern:*

Be it known that I, ENOCH P. DILL, a citizen of the United States, residing at Pittsburg, in the county of Crawford and State of Kansas, have invented new and useful Improvements in Automobile - Tire Removers, of which the following is a specification.

This invention has reference to means for facilitating the removal of a pneumatic tire from a tire carrying rim. The primary object of the invention is to produce a means whereby a tire may be easily and quickly removed from the rim of a wheel.

In carrying out my invention, I propose to provide a tire carrying rim with a plurality of spaced hinged plates, arranged in suitable pockets in the outer face of the rim, and against which the tire rests, to provide means, including a lever designed to rest against one of the edges of the rim and to engage with one of the plates, whereby to swing the plate outward of the rim and as a consequence permit of the ready detachment of the tire from the rim.

It is a further object of the invention to provide a tire carrying rim with transversely arranged plates, which are hingedly connected to one of the beads of the rim and coengage with the opposite bead of the said rim, the last mentioned portion of the plate being in the nature of a lip, to provide, in connection with such plates a lever having its engaging end notched whereby the same will be received upon one of the ribs of the rim, the said lever carrying a hook member adapted to be swung from the tire on the rim into contacting engagement with the lip of the plate, and whereby, when an outward pressure is exerted upon the lever to swing the plate upon its hinge angularly of the rim to permit of the removal of the tire from the rim. A protective element is carried by the lever and prevents the hook from contacting with the tire to overcome the liability of injury to the tire by virtue of such contact.

It is a still further object of the invention to produce a tire removing device of the class set forth which shall be of a comparatively simple construction, readily applicable to any ordinary construction of tire carrying rims, which may be operated with only a slight amount of physical exertion, and which shall be positive in its operation.

The foregoing objects, and others which will appear as the nature of the invention is better understood may be attained by the construction illustrated in the accompanying drawings, although modifications may be made therefrom.

Figure 1 is a perspective view of the tire removing tool;

Fig. 2 is a detail perspective view of a portion of a tire carrying rim showing the same provided with a removable hinged plate;

Fig. 3 is a transverse sectional view approximately on the line 3—3 of Fig. 2;

Fig. 4 is a perspective view of the removable plate;

Fig. 5 is a perspective view of a portion of a rim illustrating the pocket therein to receive the plate;

Fig. 6 is a view illustrating the application of the lever in removing the tire;

Fig. 7 is a similar view showing the tire partly removed from the rim; and

Fig. 8 is a transverse sectional view illustrating a modified form of the tire carrying rim and the removable plate received in the pocket therein, the latter being in elevation.

In the drawings, I have illustrated a portion of a vehicle wheel having its outer rim or felly provided with a tire carrying rim which is designated by the numeral 10. The tire carrying rim has its edges provided with the usual beads 11. The rim 10, upon its upper face is provided with transverse depressions forming pockets 12. The depressions are comparatively slight and are wider at one of their ends than at their other end. The inner faces of the beads are also formed with depressions communicating with the end walls of the pocket 12, and consequently the depression 13 on one of the beads 11 is of a greater length than the depression 14 on the opposite bead. One of the beads 11, at its upper and outer face is formed with a further depression 15 which communicates centrally with the depression 13, while the diametrically opposite bead has its upper face, but preferably not its outer face formed with a depression 16 that communicates with the end walls of the pocket 12. These depressions and pockets are shaped to receive removable plates 17, the body of the plate, of course, conforming to the shape of the pocket 12 and the said plate having its ends formed with flanges 18 and 19 respectively designed to be received in the depressions 13 and 16 on the oppositely disposed beads 11 of the ring. One of the flanges is centrally formed with a rounded extension 20 that is designed to be received in the depression 15, and whereby a hinge connection is thus provided between the plate 17 and the tire carrying rim 10. Extending from the flange 19 is a downturned lip 21.

When the plate is positioned on the tire carrying rim the tire 22 will rest firmly on the said rim, contacting with the plate and will have its beaded edges engaged by the beads 11 of the rim, so that the plates 11 will not interfere with the proper arrangement of the pneumatic tire 22 on the rim.

To remove the tire from the rim I provide a lever 23, the same having its inner edge notched transversely as at 24, the said notch being designed to be received on one of the beads 11 of the rim 10. Loosely positioned on the lever, a suitable distance above its notched end, is the inner end 25 of a curved member 26 that has its free end provided with an inturned hook 27. Secured to the inner thread face of the lever 23 below the hook member 27 is the straight end 28 of a flat plate. This plate, below the rounded portion 26 of the hook member is curved in the direction of the hook member as indicated by the numeral 29, and if desired a suitable facing of compressible material may be arranged upon the inner face of the said curved member.

The notched end of the hook, as stated, is arranged on one of the beads 11 of the tire carrying rim 10 to the opposite end of the rounded extension 20 which provides the hinge connection between the plate 17 and the tire carrying rim. The hook is then swung over the tire 22 so that the curved protecting plate 29 will rest upon the outer face of the tire. The hook 27 is then brought beneath the downturned lip 21 of the plate 17, and an outward pressure is exerted on the lever which swings the plate 17 outwardly or to one side of the rim 10, carrying therewith the tire 22. When the tire is brought to one side of the rim the same may be readily removed by hand from the rim.

The curved or arched protector plate is approximately centrally contacted by the arm of a bracket 15 secured on the lever 23 which reinforces the said spring plate 29 and limits the outward swinging thereof with respect to the lever.

Having thus described the invention, what is claimed is:—

1. The combination with the rim of a wheel, of plates hingedly connected to one of the edges of the rim and extending transversely of the rim and having their ends provided with lips, as and for the purpose set forth.

2. The combination with the rim of a wheel, said rim having transverse depressions providing pockets, a plate in each of said pockets having one of its ends hingedly connected to the rim and its opposite end projecting outward of the rim, as and for the purpose set forth.

3. The combination with a wheel having a tire carrying rim, the edges of which being beaded, said rim having transverse depressions forming pockets and its sides being depressed in a line with the end walls of the pockets, flanged plates received in the pocket and depression, a rounded extension on one of the flanges of the plate engaging with one of the sides of the rim and providing a hinge connection therebetween, and an extension on the opposite flange of the plate, as and for the purpose set forth.

4. The combination with the rim of a wheel, of a plate arranged transversely thereof, having a hinged connection with one side of the rim and a frictional engagement with the other side of the rim.

5. The combination with a flanged rim of a wheel, of a plate having flanged ends let in and arranged transversely of the rim, one of the ends of the said plate having hinged connection with one of the sides of the rim, the other end of the plate frictionally engaging with the outer edge of the opposite flange of the rim and projecting angularly beyond said flange.

In testimony whereof I affix my signature.

ENOCH P. DILL.

Copies of this patent may be obtained for five cents each, by addressing the "Commissioner of Patents, Washington, D. C."